No. 861,321. PATENTED JULY 30, 1907.
J. SCHERMULY.
METAL BOXING FOR DISK CORN CULTIVATORS, &c.
APPLICATION FILED DEC. 22, 1906.
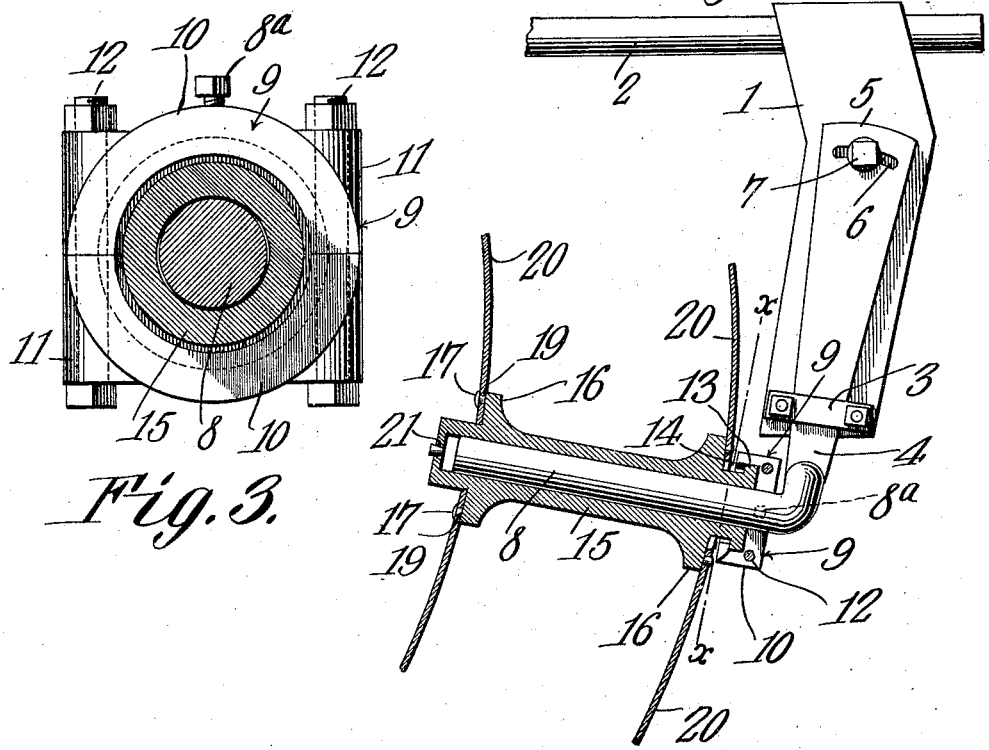
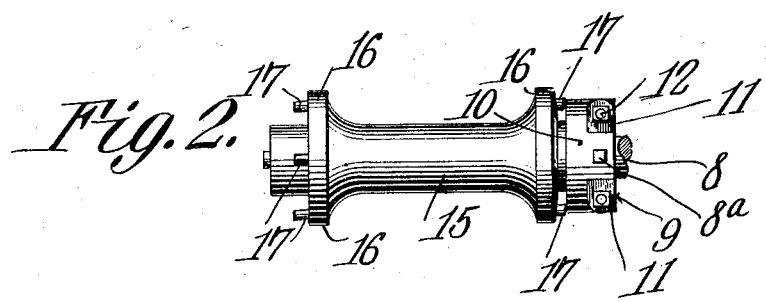
Joseph Schermuly
INVENTOR
WITNESSES:
By C.A. Snow & Co.
ATTORNEYS

UNITED STATES PATENT OFFICE.

JOSEPH SCHERMULY, OF ELLINWOOD, KANSAS.

METAL BOXING FOR DISK CORN-CULTIVATORS, &c.

No. 861,321.　　　　Specification of Letters Patent.　　　　Patented July 30, 1907.

Application filed December 22, 1906. Serial No. 349,168.

*To all whom it may concern:*

Be it known that I, JOSEPH SCHERMULY, a citizen of the United States, residing at Ellinwood, in the county of Barton and State of Kansas, have invented a new and useful Metal Boxing for Disk Corn-Cultivators, &c., of which the following is a specification.

This invention relates to disk cultivators and is designed more particularly for cutting down listed ridges.

The object of the invention is to provide a disk support of novel form whereby the disks can be readily adjusted to any desired relation to the machine.

Another object is to provide a bearing for the disks which is preferably dust-proof and which is designed to prevent the waste of lubricating oil.

A further object is to so mount the disks as to prevent lateral movement thereof upon the axle.

With these and other objects in view the invention consists of certain novel features of construction and combinations of parts which will be hereinafter more fully described and pointed out in the claims.

In the accompanying drawings is shown the preferred form of the invention.

In said drawings: Figure 1 is a horizontal section through the disks and their bearings, the connection between the bearing and the machine being shown in plan; Fig. 2 is a plan view of the bearing with the disks detached; and Fig. 3 is a sectional elevation of the inner end of the bearing said section being taken on the line x—x, Fig. 1.

Referring to the figures by characters of reference, 1 is a horizontally extending supporting plate suitably connected to the cross bar 2 of the frame of a machine and arranged upon this plate is a guide strap 3 from which loosely extends an arm 4 having a broadened end 5 formed with a transverse slot 6. This slot receives a clamping bolt 7 which engages the plate 1 and serves to hold the arm at any desired angle in relation to the plate. An axle 8 extends laterally from the outer end of the arm 4 and secured upon this axle by means of a set screw 8ª or in any other preferred manner and adjacent the arm 4 is a collar 9 made up of similar oppositely disposed sections 10 formed with laterally extending ears 11 through which clamping bolts 12 are extended. This collar has an interior annular groove 13 in which is rotatably mounted an annular flange 14 formed at one end of a sleeve 15 which is mounted to rotate on the axle. Annular flanges 16 are formed upon the sleeve and have oppositely extending projections 17 adapted to extend through openings 19 in disks 20 which are detachably mounted on the sleeve 15. The outer end of the sleeve is formed with a small opening 21 for the reception of a lubricant.

When it is desired to assemble the parts upon the axle it is necessary to place the disk 20 over the ends of the sleeve 15 and in engagement with the projections 17, after which the sleeve is placed on the axle. The two sections of the collar 9 are then placed around the axle so as to embrace the annular flange 14 and said sections 10 are then drawn together by means of bolts 12. The set screw 8ª is then turned so as to bite into the axle and secure the collar thereto. By loosening the bolt 7, the arm 4 can be swung so as to bring the axle 8 to any desired position in relation to plate 1.

It will be seen that by constructing the parts in the manner herein described the adjustment thereof can be readily effected and the bearing is rendered practically dust-proof. Moreover, as the disks are connected to the sleeve and not to the axle it is possible to make the sleeve of sufficient length to prevent the tilting of the disks which so often occurs in devices of this character and which is extremely objectionable.

What is claimed is:

The combination with a supporting device, an arm mounted to swing thereon, an axle extending from the arm, and means for locking the arm against movement; of a sleeve mounted to rotate upon the axle, said sleeve having an annular flange at one end thereof, and annular flanges intermediate its ends, disks secured to the intermediate flanges, a separable sectional collar secured upon the axle, means for binding the sections of the collar together, said collar having a continuous interior annular groove constituting a seat for the end flange of the sleeve to prevent longitudinal displacement of said sleeve.

JOSEPH SCHERMULY.

Witnesses:
　N. W. KLEPPER,
　FRED HARTMETZ.